United States Patent
Werner, Jr.

[15] 3,654,830
[45] Apr. 11, 1972

[54] SHEET METAL BLANKING AND SHEARING MACHINE

[72] Inventor: Fred C. Werner, Jr., St. Louis County, Mo.

[73] Assignee: Engel Industries, Inc., Ballwin, Mo.

[22] Filed: June 24, 1970

[21] Appl. No.: 49,322

[52] U.S. Cl. ................................. 83/208, 83/255, 83/406
[51] Int. Cl. ................................................. B26d 5/40
[58] Field of Search ............................... 83/208, 255, 406

[56] References Cited

UNITED STATES PATENTS

| | | |
|---|---|---|
| 2,325,230 | 7/1943 | Crane ................................. 83/255 X |
| 3,203,291 | 8/1965 | Elsas ................................... 83/255 X |
| 3,406,601 | 10/1968 | Clifford .............................. 83/208 X |

*Primary Examiner*—James M. Meister
*Attorney*—Jerome A. Gross

[57] ABSTRACT

Drawings of sheet metal blanks, for example those for ducts, are usually dimensioned from a leading edge. A machine having spaced-apart rams for blanking and shearing is provided with adjustable counters which may be set to dimensions called forth on the drawings. Electrical pulses generated by the flow of strip metal are counted from a datum position to the position of the first ram, used for blanking end notches. The physical spacings to an intermediate ram and to the shear are accounted for by preset tracking counters whose count is additive to those of the adjustable counters.

4 Claims, 2 Drawing Figures

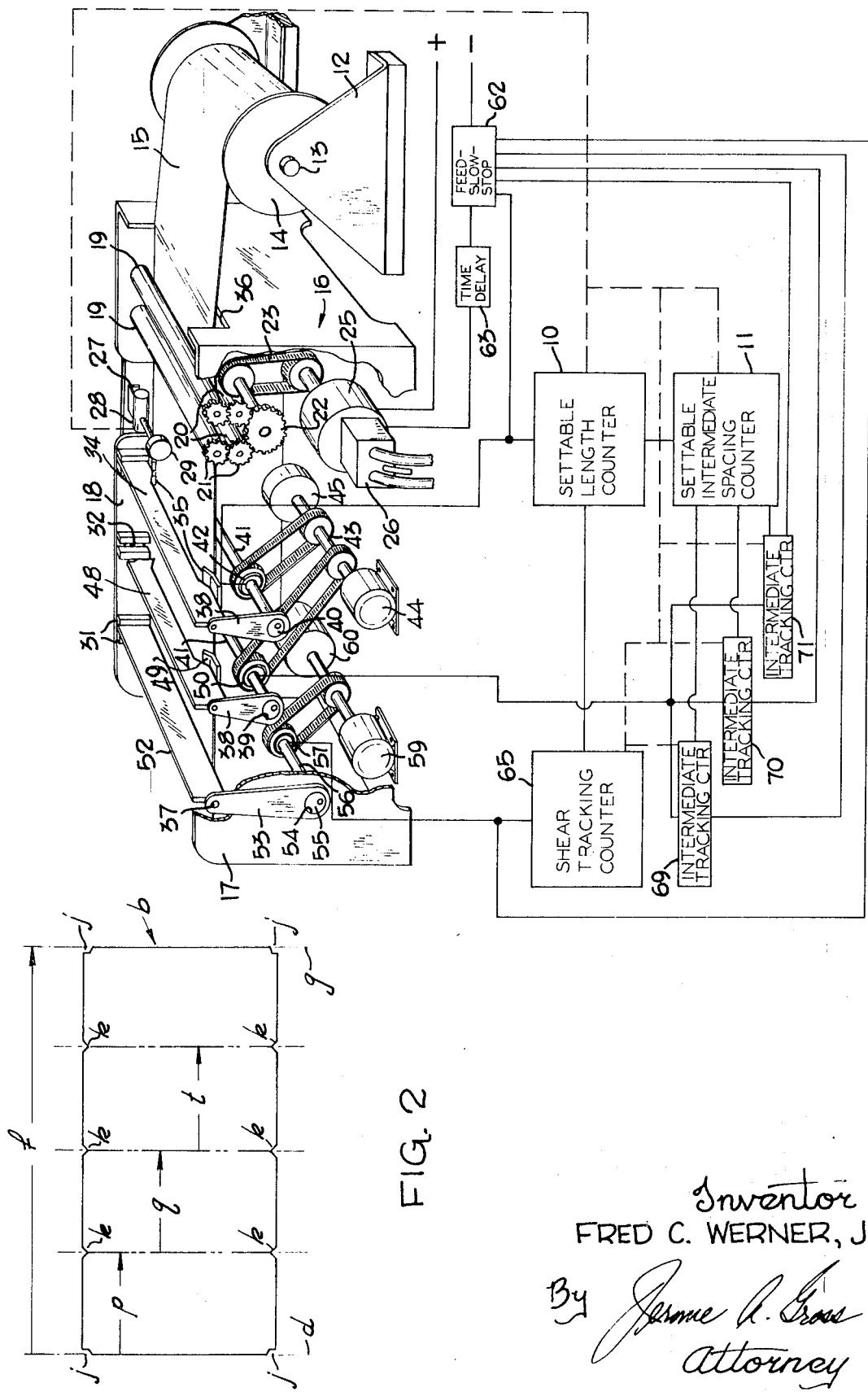

3,654,830

SHEET METAL BLANKING AND SHEARING MACHINE

BACKGROUND OF THE INVENTION

The present invention relates to machines for automatically blanking and shearing sheet metal strip fed along a linear flow path.

It is conventional to feed metal to a desired length, stop its feed and hold it in fixed position, and then cut it. U.S. Pat. No. 2,895,550 to Kastner shows an early device for this purpose. It is conventional to cut strip metal material to desired length, thus releasing it, and thereafter perform various blanking operations, such as notching to indicate a line for bending the blank, as in the manufacture of sheet metal duct sections. In some instances, attempts have been made to form notches while the sheet is moving, by dies which for brief intervals move along with the movement of the sheet. Such equipment does not assure positioning the blanked notches with the exact precision required for certain commercial purposes, for example when perfect interchangeability of duct sections is required.

Some machines have been devised in which two types of operations have been provided at the same working station along a linear flow path. For example, the textile cutting machine of U.S. Pat. No. 3,203,291 cuts die stamped rounded corners at the same working station as that of a cut-off knife. In working sheet metal, such different types of operations may require different working stations; for example, blanking dies to form notches at corners of the ends of a blank cannot conveniently be located at the same working station as a shear to cut the blank to length.

SUMMARY OF THE INVENTION

The purposes of the present invention include providing a machine to blank and cut at spaced-apart stations, with counters to set according to the dimensions of shop drawings, to measure off such dimensions as the machine feeds, stop it when required, and actuate the blanking and shearing rams with automatic compensation for spacing between them. Further purposes will be apparent from the remainder of this specification.

Generally summarizing the present invention, without limiting its scope, a flow path has one or more transverse blanking rams followed by a shear. Feed mechanism feeds the sheet metal across a position corresponding to the leading edge datum on the drawings, from which its length is measured and which serves as a reference for intermediate blanking operations.

The user of the machine first sets its adjustable counters according to the dimensions shown on the drawings. The movement of the strip generates electrical pulses which are received by the adjustable length counter and by a tracking counter preset to reflect the spacing from the datum position to the shear. When the preset count has been counted, the feed mechanism will stop, and the shear be actuated. Meantime the length counter will be counting off the flow; when the set length is counted off, the first transverse ram will blank end indicia (for example, end notches) on the sheet and restart the tracker to the shear.

Where intermediate notches are to be formed, for example, to indicate three spaced-apart bend lines in duct sections, an intermediate ram, positioned between the first ram and the shear, is used. Intermediate length counters are adjusted by the user to correspond to dimensions shown on shop drawings, from the leading edge to the first notch, and thence to the second and third notches. A tracking counter mechanism, preset to reflect the spacing from the datum position to the intermediate ram, automatically adds to its count to the dimensioned length from the leading edge to the first such intermediate notch. The intermediate ram will then be actuated as each successive set length is counted off.

BRIEF DESCRIPTION OF THE DRAWINGS

FIG. 1 is a schematic view of a multi-station machine for blanking and shearing sheet metal, whose conventional electronic elements are shown schematically.

FIG. 2 is a plan view of a blanked sheet metal duct section of the type formed on the machine of FIG. 1, showing its dimensions to which the machine is to be adjusted.

DESCRIPTION OF THE PREFERRED EMBODIMENT

The preferred machine of FIG. 1, to be described, is designed to blank and shear sheet metal work pieces which require the use of three separate operating rams, which in the present machine are spaced fairly close to each other along the path of flow of strip metal. It is readily adjusted to blank and shear pieces which are dimensioned in flat pattern and whose constant width equals that of a coil of strip metal.

FIG. 2 shows the pattern for a duct section $b$, as used in heating or air-conditioning. The length of the duct section, when finally formed, is the width of the coiled strip metal used. Shop drawings for such duct blanks are conveniently dimensioned from a left hand line, referred to as the leading edge datum $d$. Starting with this leading edge datum, the overall length $f$ is measured, being the distance from the datum $d$ to a line of shearing $g$, which marks the beginning of a second duct section blank. A shearing cut will be made at the leading edge datum $d$, and thereafter at the line of shearing $g$ at the end of the blank $b$ and each successive blank.

Coincident with the leading edge datum $d$ and the lines of shearing $g$, end notches $j$ are to be blanked. Using the machine of the present invention, the end notches $j$ are formed as a separate operation prior to the shearing operation, despite the fact that the spacing between successive end notches $j$ corresponds with the spacing from the datum $d$ to the line of shearing $g$. However the notches $j$ at the end of each blank $b$ and those at the beginning of the following blank are formed together; the end notches $j$ in the opposed edges of the strip delineate the length $f$ to be sheared.

Three sets of intermediate notches $k$ are formed at successive intermediate dimensions $p$, $q$, $t$, which prescribe the lines along which the duct blank $b$ will ultimately be folded. The first of the intermediate blanking intervals $p$ is normally measured from the leading edge datum $d$; the interval $q$ to the next intermediate notches may be measured from the end of the first spacing $p$; and similarly for the subsequent interval $t$.

The apparatus shown in FIG. 1 makes it possible to take a working drawing dimensioned as in FIG. 2 and set the length $f$ on a settable length counter 10, likewise setting the spacings $p$, $q$, $t$ to and between the intermediate circuitry. The machine may then be started, and it will perform all the required operations automatically. Assuming that the spacings between its three rams (to be described) are not large relative to the space intervals between the various operations, it will first blank the end notches $j$ along a leading edge datum $d$, then measure off the distance to the third ram and shear along this leading edge datum, then, continuing to take account of the various ram spacings, blank each of the successive intermediate notches $k$ and the end notches $j$ at the end of the blank, and then shear at the line $j$; then re-commence the series of operations on the next part to be blanked and sheared. Should the space intervals between operations to be performed be so small as to require some operations on a subsequent blank prior to shear-off of the first blank $b$, these will automatically be performed.

The preferred embodiment, in a simplified form, will now be described.

In fixed position adjacent to the present machine is a conventional strip de-coiler 12, having a lateral shaft 13 mounting a reel 14 which holds a coil 15 of strip metal.

Aligned with the flow path established by the lateral shaft 13 is the present machine. It includes a rigid framework 16 having parallel near and far sides 17, 18 spaced from each other a width greater than that of the strip metal 15. At the end of the machine adjacent to the de-coiler 12, conventional upper and lower feed and leveling rolls 19, 20 are provided. These are illustrated in simplified form, the upper rolls 19 being driven from the lower rolls 20 by intermeshing spur gears 21, the lower spur gears 21 being driven by a driving gear 22 driven by a chain drive 23 from a hydraulic motor mechanism 25 of the positive displacement type which also serves as a brake. Hydraulic fluid pumped from a source not shown to the hydraulic motor mechanism 25 will drive the feed rolls 19, 20, advancing the sheet metal strip 15, slowing its feed and stopping it positively by electrical control of a conventional valve mechanism 26.

Downstream from the feed rolls 19, 20, supported by a bracket 27, is a conventional linear flow pulse generator or transducer 28, having a wheel 29 which bears downward upon and rotates as the sheet metal strip 15 moves along the flow path. The pulse generator 28 thus generates electrical pulses proportionate in number to such linear flow.

Downstream from it, both sides 17, 18 of the framework 16 above the flow path are provided with pairs of guides 31, with a slot 32 between each pair. Only those at the far side 18 are illustrated. Between the first of the pairs of guides 31 is mounted a first transverse ram 34, to extend perpendicular to the path of flow. Along its lower edge are mounted end notch blanking dies 35, formed to delineate the length of a blank to be sheared, in the present case the end notches $j$ at the end of a blank $b$ and at the beginning of the following blank. Along the bed 36 of the machine, conventional means (not illustrated) are provided to cooperate with the blanking dies 35.

Ram driving pins 37, projecting outward through the slots 32 in the frame sides 17, 18, enable the ram 34 to be drawn downward between the guides 31 by conventional arm and eccentric mechanism. A pair of driving arms 38 outward of the sides 17, 18, through which the pins 37 pass, have at their lower ends large diameter bores 39. In each of these rotates a driving eccentric 40 mounted on a transverse shaft 41. The shaft 41 is chain driven through a clutch 42 which may be energized electrically for coupling to a driving shaft 43 having a constantly operating electric motor 44 and flywheel 45.

Spaced downstream from the first transverse ram 34 is a second transverse ram 48. On its lower edge are mounted blanking dies 49 of such conformation to perform an intermediate blanking operation, in the present case to blank the intermediate V-notches $k$ in the edge of the strip 15. The second ram 48 is similarly supported between guides 31; and similar driving pins 37 projecting through slots 32 to be drawn downward by driving arms 38 outwardly of the frame sides 17, 18 when driving eccentrics 40 turn within bores 39. A transverse shaft 41 for the intermediate ram 48 is operated by an electrical clutch 50 to be chain driven from the same driving shaft 43.

For shearing, a more powerful ram 52 is similarly mounted between the sides 17, 18, being positioned by similar pairs of guides 31 so that its driving pins 37 project through similar slots 32. The shearing ram 52 is drawn downward by large driving arms 53 in whose lower ends are large diameter bores 54. Driving eccentrics 55, turning in the bores 54 when driven by a transverse shaft 56, are powered by an electrically actuated clutch 57 on a driving shaft 58, to be driven by a second constantly operating electric motor 59 and its flywheel 50.

The settable length counter 10 and settable intermediate spacing counter 11 are mounted on a control panel, not shown. The length counter 10 is so connected to the pulse generator 28 (by conventional wiring indicated schematically in dashed lines) as to receive and count pulses starting with the start of feeding movement of the strip metal 15 across a position along the bed 36 chosen to correspond to the leading edge datum $d$ of the blank to be made. Most conveniently, this datum-corresponding position is the position of the first transverse ram 34. Thus, in the preferred embodiment, the length counter 10 is set at the length $f$; when the first transverse ram 34 has been actuated to delineate on the strip 15 and leading edge datum $d$ by blanking the end notches $j$, the settable length counter 10 will reset to read the length $f$. Thereafter, when a number of pulses has been counted corresponding to the length $f$ the length counter 10 will read zero and again reset itself to the length $f$. The settable length counter 10 has conventional switching means which, when it zeros, stops the feed and actuates the ram 34. In order to assure accuracy of position, the feed slows to about one-tenth its normal rate shortly before stopping. Thus, just before stopping the length counter 10 actuates the slow-down function of a feed-slow-stop switching circuit 62, which electrically operates the valve mechanism 26 to slow the hydraulic motor 25. At the point of zeroing, the feed-slow-stop circuitry 62 will cause the valve mechanism 26 to stop the motor 25; and the settable length counter 10 will make a circuit to the electrical clutch 42, to draw down the first transverse ram 34, so that the end notch dies 35 blank the end notches $j$. A time delay circuit 63 connected to the feed-slow-stop circuitry 62 will delay the restart of feed, for an interval sufficient to permit the ram 34 to move away from the flow path, clearing the strip 15 prior to restart.

Each time the settable length counter 10 reaches the point of zeroing, a shear tracking counter 65 is gated on; and pulses received thereafter are counted by it as well as by the length counter 10. This tracking counter 65 is set to count that fixed number of pulses which corresponds to the linear spacing from the first ram 38 to the shearing ram 52. As this count is approached, the slow-stop functions of the feed-slow-stop circuitry 62 are similarly brought into play. When its fixed count is completed, the shear tracking counter 65 causes the circuitry 62 to bring the hydraulic feed motor 25 to a stop, and a circuit is made to the electrical clutch 57 of the shearing ram, to shear the strip 15 to the length $f$. The time delay 63 and the feed portion of the feed-slow-stop circuitry 62 then open the valve mechanism 26 to restart the hydraulic feed motor 25. The shear tracking counter 65 then resets itself and is gated off until the settable length counter 10 again zeros.

Meantime, effective with the resetting of the settable length counter 10, a settable intermediate spacing counter 11 has also been counting pulses. The settable intermediate spacing counter 11 has at least three settings. The user sets the first of these at the numerical value of the spacing $p$, the second at the spacing $q$ and the third at the spacing $t$. When it has counted the number of pulses corresponding to the length $p$, it then performs several functions. One function is to gate on a first intermediate tracking counter 69, having a fixed count corresponding to the spacing from the first ram 34 to the intermediate ram 48. As the fixed count of the intermediate tracking counter 69 is approached, it will again engage the slowing function of the speed-slow-stop circuitry 62; when its fixed count is reached, it is gated off, but switches on the circuitry 62 to operate the valve mechanism 26 to stop the feed motor 25 and make a circuit to the second clutch 50. This actuates the intermediate ram 48, so that its blanking dies 49 blank the V-notches $k$ opposite each other at the spacing $p$ from the leading edge datum $d$. After the time delay 63 has provided a suitable interval to permit the ram 48 to rise and clear the strip 15, the feed motor 25 again goes into action.

A second function performed when the spacing counter 11 reaches the count $p$ is to reset itself to the second of its settings $q$, and continue counting. When the number of pulses thereafter counted corresponds to the length $q$, the intermediate spacing counter 11 gates on a second intermediate tracking counter 70, which (like the first intermediate tracking counter 69) has a fixed count corresponding to the spacing from the first ram 34 to the intermediate ram 48. When this fixed count is approached, the slowing function of the speed-slow-stop circuitry 62 is again engaged; when the count is reached, the tracking counter 70 is gated off but it switches on the circuitry 62 to stop the feed motor 25 and to make a circuit to the second clutch 50. Thus, notches $k$ are blanked at the spacing $q$. Restart is the same as heretofore described.

Reverting to the moment when the intermediate spacing counter 11 completed the count of the length $q$ and gated the second intermediate tracking counter 70 into circuit, the intermediate spacing counter 11 then again reset itself, this time to the spacing $t$. After it has counted out this spacing, it deactivates its counting until the length counter 10 reaches zero, resets itself, and resets the intermediate spacing counter 11. However when the spacing counter 11 so deactivates its counting, it gates on a third intermediate tracking counter 71, fixed to count the same spacing between the first ram 34 and the intermediate ram 48. A third set of the notches $k$ is then blanked at the spacing $t$, in the same manner.

It is understood that the clutches 42, 50, 57 are of the type which automatically disengage after a single cycling of the respective rams which they operate.

The mechanism and circuitry may obviously be modified to change the number of rams, the functions which they perform, and number of times each operates within a single overall cycle.

I claim:

1. A multi-station machine for blanking and shearing sheet metal to linear dimensions measured from a leading edge datum, comprising
   a framework,
   means thereon to feed a strip of sheet metal along a linear path and to start and stop such feed,
   a first transverse ram having end blanking means,
   transverse shear means spaced downstream therefrom,
   means to generate electrical pulses proportionate in number to the linear flow of sheet metal strip along such path,
   length counter means, settable to a desired blank length, to receive and count such pulses starting with the start of feeding movement of such sheet metal across the position of such first transverse ram, whereby its position corresponds to such leading edge datum, to reset itself when a count corresponding to the set length is reached, to stop such feed and to actuate the first ram, thereby to delineate the length of a blank to be sheared,
   means to restart such feed with a delay after such actuation, whereby to permit said first blanking means to move away from such linear path and clear such strip prior to restart, and
   shear tracker counting means, initiated at each reset of the length counter means, to receive and count such pulses in a fixed number corresponding to the spacing from the first ram to the transverse shear, and when such number is reached to stop such feed and actuate the shear and thereby to cut the blank to length.

2. A multi-station machine for blanking and shearing sheet metal as defined in claim 1, together with
   an intermediate transverse ram spaced between the first ram and the shear, and having intermediate blanking means,
   settable intermediate blanking position counter means to receive such pulses and count out a desired intermediate position from such leading edge datum,
   intermediate tracker counting means to receive and count such pulses in a fixed number corresponding to the spacing from the first ram to the intermediate ram,
   additive means, coupling the intermediate counter means with the intermediate tracker counting means, to stop such feed when their sum is counted and actuate the intermediate ram and thereby to perform an intermediate blanking operation at such intermediate position, and
   means to restart such feed with a delay after such actuation, whereby to permit said intermediate blanking means to rise above and clear such strip prior to restart.

3. A multi-station machine for blanking and shearing sheet metal as defined in claim 2, together with
   additional settable intermediate blanking position counter means to receive such pulses and count out additional intermediate positions, and
   additional additive means, coupling the additional settable intermediate blanking position counter means with the intermediate tracker counting means, to stop such feed when the sum is reached of the count of such fixed spacing plus the count to each of said additional intermediate positions, and then to actuate the intermediate ram and thereby perform an additional intermediate blanking operation at each such additional intermediate position.

4. A multi-station machine for blanking and shearing sheet metal to linear dimensions measured from a leading edge datum, comprising
   a framework,
   means thereon to feed a strip of sheet metal along a linear path and to start and stop such feed,
   a first transverse ram having end blanking means,
   transverse shear means spaced downstream therefrom,
   means to establish a position along said path in advance of first transverse ram as a datum-corresponding position,
   means to generate electrical pulses proportionate in number to the linear flow of sheet metal strip along such path,
   length counter means, settable to a desired blank length, to receive and count such pulses starting with the start of feeding movement of such sheet metal across the datum-corresponding position,
   first ram tracker counting means, coupled additive to the settable length counter means, to receive and count such pulses in a fixed number corresponding to the spacing from the datum-corresponding position to the first ram, and when their sum is reached to stop such feed and actuate the first ram and thereby delineate the length of a blank to be sheared,
   means to restart such feed with a delay after such actuation, whereby to permit said first blanking means to move away from such linear path and clear such strip prior to restart, and
   shear tracker counting means to receive and count such pulses in a fixed number corresponding to the spacing from the datum-corresponding position to the transverse shear, and when such number is reached to stop such feed and actuate the shear and thereby to cut the blank to length.

* * * * *